(12) United States Patent
Chen et al.

(10) Patent No.: US 6,815,925 B2
(45) Date of Patent: Nov. 9, 2004

(54) SYSTEMS AND METHODS FOR ELECTRIC MOTOR CONTROL

(75) Inventors: Li Chen, Livonia, MI (US); Xingyi Xu, Canton, MI (US); Vinod Reddy, Ocala, FL (US); Richard J. Hampo, Plymouth, MI (US); Kerry E. Grand, Chesterfield, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/293,911

(22) Filed: Nov. 12, 2002

(65) Prior Publication Data

US 2004/0090205 A1 May 13, 2004

Related U.S. Application Data

(60) Provisional application No. 60/421,113, filed on Nov. 13, 2001.

(51) Int. Cl.$^7$ ................................................ H02P 1/24
(52) U.S. Cl. ................. 318/727; 318/767; 318/772; 318/798; 318/804; 318/801
(58) Field of Search ................. 318/727, 767, 318/772, 798–802, 804

(56) References Cited

U.S. PATENT DOCUMENTS

| | | | |
|---|---|---|---|
| 4,023,083 A | 5/1977 | Plunkett | 318/227 |
| 4,484,126 A | 11/1984 | Fulton et al. | 318/800 |
| 5,057,760 A | 10/1991 | Dadpey et al. | 318/807 |
| 5,446,363 A | * 8/1995 | Kurosawa et al. | 318/806 |
| 5,459,386 A | 10/1995 | Okachi et al. | 318/727 |
| 5,481,168 A | 1/1996 | Mutoh et al. | 318/432 |
| 5,650,700 A | 7/1997 | Mutoh et al. | 318/432 |
| 5,739,664 A | * 4/1998 | Deng et al. | 318/808 |
| 5,796,236 A | * 8/1998 | Royak | 318/804 |
| 5,834,910 A | 11/1998 | Tsurumi et al. | 318/139 |
| 6,147,470 A | * 11/2000 | Ohashi et al. | 318/757 |

FOREIGN PATENT DOCUMENTS

EP    0 536 569 A2   4/1993

* cited by examiner

Primary Examiner—Rina Duda
(74) Attorney, Agent, or Firm—Seed IP Law Group PLLC

(57) ABSTRACT

Systems and methods for controlling and/or calculating the torque for a field oriented induction motor operating at a given stator frequency. The systems and methods include calculating the torque using a first algorithm when the motor is at or below a first predetermined stator frequency, a second algorithm when the motor is at or above a second predetermined stator frequency, and a third algorithm when the motor is between the first predetermined stator frequency and the second predetermined stator frequency.

25 Claims, 2 Drawing Sheets

SYSTEMS AND METHODS FOR ELECTRIC MOTOR CONTROL

CROSS-REFERENCE TO RELATED APPLICATION

This application claims the benefit under 35 U.S.C. §119 (e) of the currently co-pending U.S. Provisional Patent Application, entitled System and Method for Traction Drive Control Ser. No. 60/421,113, filed on Nov. 13, 2001 converted on Nov. 8, 2002 from U.S. Utility patent application Ser. No. 10/008,002, filed Nov. 13, 2001, via petition filed on Nov. 8, 2002, such applications being hereby incorporated by reference in their entireties.

BACKGROUND OF THE INVENTION

1. Field of the Invention

The present systems and methods relate generally to enhancing the performance of electric motors operable at a variety of speeds and, more specifically, to enhancing the accuracy of torque calculations to operate such motors. The described systems and methods may be used by a variety of applications, for example, with a powertrain related-system or a traction drive system.

2. Description of the Related Art

The "fuel" powering a field oriented induction motor is current. This current may be divided into two components, torque current and flux current. Torque current may be viewed as that component of the current which generates motive force, or torque. Flux current may be viewed as that component of the current which generates magnetic flux in the rotor. Shaft torque and rotor flux are related, with shaft torque being proportional to the product of rotor flux times torque current.

A knowledge of the level of torque produced by a field oriented induction motor during operation is helpful to the effective operation of a variable speed system, requiring precise control, such as a traction drive system or compressor drive system, as will be readily apparent to those skilled in the relevant art. Typically, the torque produced by a field oriented induction motor is calculated using two equations, one for low-speed operation and one for high-speed operation. Under high-speed operating conditions, torque current, back-EMF voltage, and speed are used to estimate torque. Under low-speed operating conditions, the back-EMF voltage is too low to be used to estimate torque. Thus, torque current, flux current, and motor inductance are used. These equations, however, break down in the "in-between" or interface range, resulting in inaccurate torque calculations. These calculations, relied upon by the traction drive system, may lead to diminished performance of the system.

BRIEF SUMMARY OF THE INVENTION

The present systems and methods overcome the problems discussed above and enhance the performance of electric motors operable at a variety of speeds, especially when used with a variety of applications, such as powertrain-related systems or traction drive systems. Specifically, the present systems and methods are directed to enhancing the accuracy of torque calculations utilized to operate electric motors for a variety of applications.

In one embodiment, a system having an electric motor controller (e.g., traction drive or powertrain-related systems) is disclosed having a field oriented induction motor operating at a detected or inferred stator frequency. The system controller includes an analyzer operable for calculating the torque produced by the motor based on a relationship that is dependent upon the stator frequency. The controlled motor has a first predetermined stator frequency when the system operates at a first predetermined speed and a second predetermined stator frequency when the system operates at a second predetermined speed. The analyzer of the controller calculates the torque using a first algorithm when the controlled motor is at or below the first predetermined stator frequency, a second algorithm when the controlled motor is at or above the second predetermined stator frequency, and a third algorithm when the controlled motor is between the first predetermined stator frequency and the second predetermined stator frequency.

In another embodiment, a method is provided for calculating and supplying the current necessary to provide a specified torque of a field oriented induction motor operating at a given, or measured, stator frequency. The method includes receiving the stator frequency state of the motor (e.g., receiving the stator frequency via inference from a measured current, or a measured speed of a rotor of the motor, or a mechanical load driven by the rotor of the motor) and calculating the current necessary to provide the specified torque by using a first algorithm when the motor is at or below a first predetermined stator frequency. A second, algorithm is utilized to calculate the current necessary to provide the specified torque when the motor is at or above a second predetermined stator frequency, and a third algorithm is utilized to calculate the current necessary to provide the specified torque when the motor is between the first predetermined stator frequency and the second predetermined stator frequency.

In one or more various embodiments, related systems include but are not limited to circuitry and/or programming for effecting the foregoing-referenced method embodiments. The circuitry and/or programming can be virtually any combination of hardware, software, and/or firmware configured to effect the foregoing-referenced method embodiments, depending upon the design choices of the system designer.

In another embodiment, a system for use with an electric powertrain between a field oriented induction motor and a mechanical load is characterized by a torque-control circuit coupleable to respond to a desired-torque input, the torque-control circuit coupleable to infer a stator frequency of the field oriented induction control motor and the torque-control circuit further coupleable to supply a current to the field oriented induction motor, the torque-control circuit configurable to supply the current dependent upon the desired-torque input, the stator frequency, and a combination of an upper-range stator frequency torque equation and a lower-range stator frequency torque equation.

In another embodiment, a motorized vehicle is characterized by a powertrain having an input mechanically coupled to a field oriented induction motor and an output mechanically coupled to a load, the powertrain having a torque-control circuit responsive to a desired-torque input, the torque-control circuit coupled to infer a stator frequency of the field oriented induction control motor and the torque-control circuit further coupled to supply a current to the field oriented induction motor, the torque-control circuit configured to supply the current on the basis of a relationship keyed to at least two predetermined stator frequencies.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the non-limiting detailed description set forth herein.

DETAILED DESCRIPTION OF THE INVENTION

Figure 1:
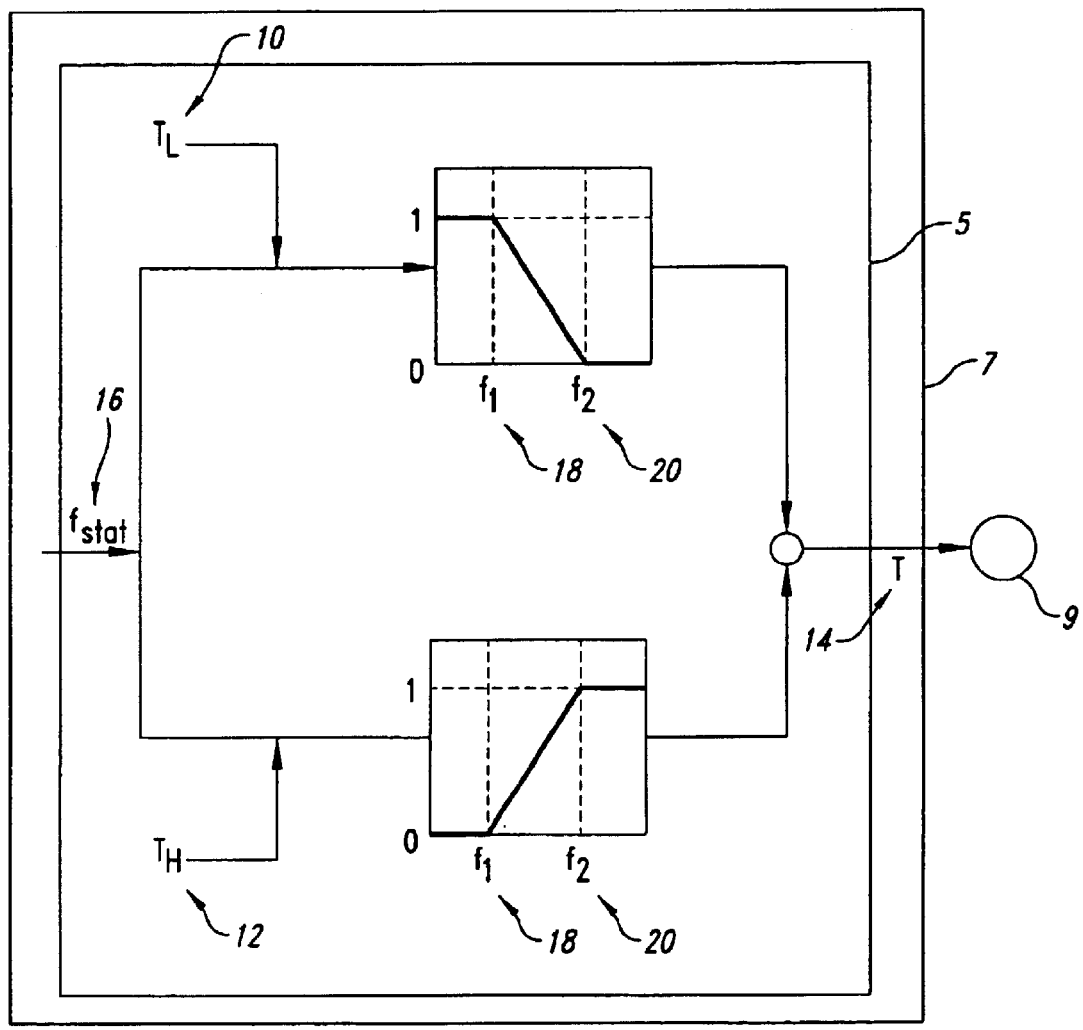
FIG. 1 is a flow diagram illustrating the contribution of a low speed torque equation and a high speed torque equation to the torque of a system having an electric motor (e.g., a powertrain-related system or a traction drive system) in accordance with the present systems and methods.

As described above, operating performance and control characteristics of electric motors often vary based upon running speed. More specifically, certain relationships, often expressed in the form of mathematical equations, do not hold true across the entirety of a particular electric motor's operating range. This has been found to be true with respect to torque characteristics which are of importance when systems having electric motor controllers (e.g., powertrain-related or traction drive systems) are considered. From an operator's perspective, torque output or power is an important perceived performance characteristic. That is, the operator of an electric motor normally commands a certain torque output from the motor; in the case of an electric traction drive system, this command is typically signaled as a desired acceleration which may be communicated as simply as by accelerator pedal position. The responsive behavior of the vehicle, based on this instruction, is usually what the user of the vehicle bases his or her performance evaluation on. Therefore, it is important that the modeling and control functions be true, regardless of motor speed, to assure smooth performance and consistent response from the electric motor based on the user's instruction.

Because of the inconsistency in torque calculations between high and low speed motor performance, it has been found to be advantageous to control electric motors by use of two different control relationships or equations based on running speed of the motor. If a discrete break point is utilized to divide between high and low speed operation, it has been found that torque control of the electric motor and performance characteristics of the electric motor in the speed range around that break point deteriorates. For this reason, the present systems and methods introduce a transitional relationship to be utilized for control of electric motors in this speed range around the break point between high and low speed operation. As a result, a total of three relationships or equations are used for calculating torque values of an electric motor across the entire range of operation from low to high speeds.

For the high-speed operation of a field oriented induction motor, the torque (T) is typically calculated from the back-EMF voltage using the following equation:

$$T = \frac{3P}{2} \frac{Emf_q I_q + Emf_d I_d}{\omega_e}, \qquad (1)$$

where P is the number of pole pairs of the motor, $Emf_q$ is the back-EMF voltage on the q-axis, $Emf_d$ is the back-EMF voltage on the d-axis, $I_q$ is the torque current, $I_d$ is the flux current, and $\omega_e$ is the motor-excited frequency. Since the motor is a field oriented control system, $$Emf_d = 0. \qquad (2)$$

Thus, the high-speed torque equation becomes:

$$T = \frac{3P}{2} \frac{Emf_q I_q}{\omega_e}. \qquad (3)$$

Equation (3) may be used to accurately estimate torque only at high speeds, when the stator frequency ($f_{stat}$) is above a predetermined level. This frequency limit depends upon the characteristics of a given motor and exists due to the fact that at low speeds the back-EMF voltage is too low to be useful for the calculation of torque.

For the low-speed operation of a field oriented induction motor, the torque (T) is typically calculated using the following equation:

$$T = \frac{3P}{2} \frac{L_m}{L_r} \lambda I_q, \qquad (4)$$

where P is the number of pole pairs of the motor and $L_m$ and $L_r$ are, respectively, the mutual, or magnetizing, inductance and the total rotor inductance (the mutual inductance plus the rotor leakage inductance) for the motor. $\lambda$ is the flux of the motor and $I_q$, as discussed above, is the torque current. Since, $$\lambda = L_m I_d, \text{tm} \qquad (5)$$

where $I_d$ is the flux current, the torque (T) becomes:

$$T = \frac{3P}{2} \frac{L_m^2}{L_r} I_d I_q. \qquad (6)$$

Since, $$L_h = \frac{L_m^2}{L_r}, \qquad (7)$$

where $L_h$ is the transient inductance, the torque (T) becomes:

$$T = \frac{3P}{2} L_h I_d I_q. \qquad (8)$$

Equation (8) may be used to accurately estimate torque only at low speeds, when the stator frequency ($f_{stat}$) is below a predetermined level. This frequency limit depends upon the characteristics of a given motor.

Typically, there is a gap between low-speed stator frequency ($f_{stat}$) limit, now referred to as $f_1$, and the high-speed stator frequency ($f_{stat}$) limit, now referred to as $f_2$. For stator frequencies ($f_{stat}$) falling into this gap or interface zone, neither the low-speed equation (8) nor the high-speed equation (3) provide accurate torque calculations. However, the present systems and methods provide a linear interpolation function for blending the low-speed equation (8) and the high-speed equation (3) for this range of stator frequencies ($f_{stat}$).

If $f_{stat}$ falls between $f_1$, the low-speed stator frequency limit, and $f_2$, the high-speed stator frequency limit, then the torque (T) may be calculated using the following equation:

$$T = (f_{stat} - f_1)\frac{(T_H - T_L)}{(f_2 - f_1)}, (f_1 < f_{stat} < f_2), \quad (9)$$

where, $$T_L = \frac{3P}{2}L_h I_d I_q, (f_{stat} < f_1), \quad (10)$$

and, $$T_H = \frac{3P}{2}\frac{Emf_q I_q}{\omega_e}, (f_{stat} > f_2). \quad (11)$$

Figure 2:
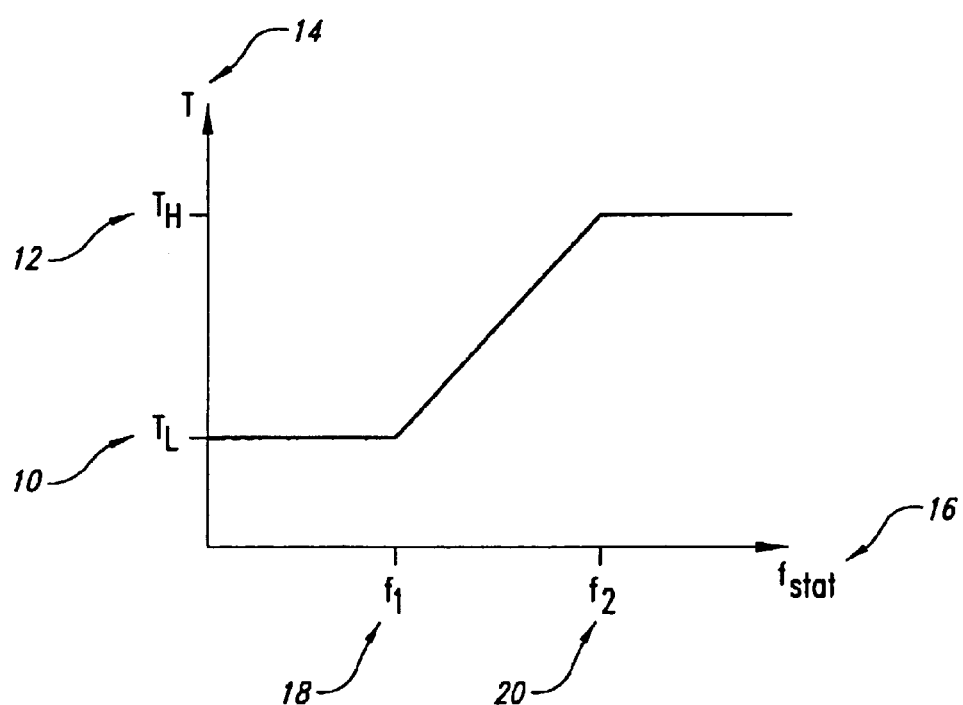
FIG. 2 is a graph further illustrating the blending of the low speed torque equation and the high speed torque equation in an interface speed range in accordance with the present systems and methods.

FIG. 1 illustrates this blending of the low-speed torque equation (10) and the high-speed torque equation (11) in an analyzer 5 of a controller 7. The contribution of $T_L$ 10 and $T_H$ 12 to torque (T) 14 is a function of the value of $f_{stat}$ 16. For low-speed operation of motor 9, when $f_{stat}$ 16 is less than $f_1$ 18, $T_L$ 10 contributes 100% and $T_H$ 12 contributes 0% to torque (T) 14. For high-speed operation of motor 9, when $f_{stat}$ 16 is greater than $f_2$ 20, $T_H$ 12 contributes 100% and $T_L$ 10 contributes 0% to torque (T) 14. When $f_{stat}$ 16 is between $f_1$ 18 and $f_2$ 20, the percent contribution of $T_L$ 10 $T_H$ 12 to torque (T) 14 varies linearly, with the contribution of $T_L$ 10 and $T_H$ 12 being inversely related. FIG. 2 further illustrates this blending of the low-speed torque equation (10) and the high-speed torque equation (11).

Thus, as can be seen from the foregoing equations, using the stator frequency (which in one example embodiment is inferred from a direct current measurement and which in another example embodiment is inferred from a speed of a mechanical component) and desired torque (which in one example embodiment is specified via operator manipulation of an accelerator pedal), the above equations can be used to control the motor 9 by using conventional control techniques to supply the motor 9 with current calculated such that the motor 9 develops or supplies the desired torque using equations appropriate to the speed at which the motor is operating. For example, the abovedescribed analyzer module 5 (which those skilled in the art will recognize may be hardware, software, firmware or any combination thereof), can use the desired-torque input, as well as the sensed speed (from which the stator frequency is inferred) of the motor 9 to calculate one or more sets of desired $I_q$ and $I_d$ which will provide the desired torque at the sensed speed, and thereafter the current to the motor 9 can be controlled such that the desired $I_q$ and $I_d$ are achieved. Furthermore, those having ordinary skill in the art will appreciate that should the speed of the motor 9 transition into another range, the analyzer 5 will recalculate the desired one or more sets of $I_q$ and $I_d$ and the controller targeted accordingly, and that the foregoing process goes on more or less continuously. Those having ordinary skill in the art will appreciate the conventional techniques for controlling $I_q$ and $I_d$ are well known, and hence such well known techniques will not be reiterated here.

The present systems and methods have been described with reference to examples and preferred embodiments. Other examples and embodiments may achieve the same results. Variations in and modifications to the present systems and methods will be apparent to those skilled in the art and the following claims are intended to cover all such equivalents.

What is claimed is:

1. A system comprising:
   an electric motor controller having
      an analyzer operable for calculating a torque produced by a field oriented induction motor, the motor operating at a stator frequency; and
   wherein the analyzer calculates the torque using an algorithm which is dependent upon the stator frequency, the analyzer calculating the torque using a first algorithm when the motor is at or below a first predetermined stator frequency, a second algorithm when the motor is at or above a second predetermined stator frequency, and a third algorithm when the motor is between the first predetermined stator frequency and the second predetermined stator frequency.

2. The system of claim 1, wherein the motor is inferred as operating at or below the first predetermined stator frequency when the system operates at or below a first predetermined speed.

3. The system of claim 1, wherein the first algorithm comprises:

$$T_L = \frac{3P}{2}L_h I_d I_q, (f_{stat} < f_1)$$

wherein
   $T_L$ is the torque when the motor is at or below the first predetermined stator frequency,
   P is a number of pole pairs of the motor,
   $L_h$ is transient inductance,
   $I_d$ is flux current,
   $I_q$ is torque current,
   $f_{stat}$ is stator frequency, and
   $f_1$ is a low-speed stator frequency limit.

4. The system of claim 1, wherein the motor is inferred as operating at or above the second predetermined stator frequency when the system operates at or above a second predetermined speed.

5. The system of claim 1, wherein the second algorithm comprises:

$$T_H = \frac{3P}{2}\frac{Emf_q I_q}{\omega_e}, (f_{stat} > f_2)$$

wherein
   $T_H$ is the torque when the motor is at or above the second predetermined stator frequency,
   P is a number of pole pairs of the motor,
   $Emf_q$ is a back-EMF voltage on a q-axis,
   $I_q$ is torque current,
   $\omega_e$ is motor-excited frequency,
   $f_{stat}$ is stator frequency, and
   $f_2$ is a high-speed stator frequency limit.

6. The system of claim 1, wherein the motor is inferred as operating above the first predetermined stator frequency and below the second predetermined stator frequency when the system operates above a first predetermined speed and below a second predetermined speed.

7. The system of claim 1, wherein the third algorithm comprises:

$$T = (f_{stat} - f_1)\frac{(T_H - T_L)}{(f_2 - f_1)}, (f_1 < f_{stat} < f_2)$$

wherein
   T is the torque when the motor is between the first predetermined stator frequency and the second predetermined stator frequency, $f_{stat}$ is stator frequency, $f_1$ is a low-speed stator frequency limit, $T_H$ is the torque when the motor is at or above the second predetermined stator frequency, $T_L$ is the torque when the motor is at or below the first predetermined stator frequency, and $f_2$ is a high-speed stator frequency.

8. A method for calculating a torque for a field oriented induction motor operating at a stator frequency, the method comprising:

receiving the stator frequency of the motor; and calculating the torque using a first algorithm when the motor is at or below a first predetermined stator frequency, a second algorithm when the motor is at or above a second predetermined stator frequency, and a third algorithm when the motor is between the first predetermined stator frequency and the second predetermined stator frequency.

9. The torque calculation method of claim 8, wherein the first algorithm comprises:

$$T_L = \frac{3P}{2} L_h I_d I_q, (f_{stat} < f_1)$$

wherein $T_L$ is the torque when the motor is at or below the first predetermined stator frequency, P is a number of pole pairs of the motor, $L_h$ is transient inductance, $I_d$ is flux current, $I_q$ is torque current, $f_{stat}$ is stator frequency, and $f_1$ is a low-speed stator frequency limit.

10. The torque calculation method of claim 8, wherein the second algorithm comprises:

$$T_H = \frac{3P}{2} \frac{Emf_q I_q}{\omega_e}, (f_{stat} > f_2)$$

wherein $T_H$ is the torque when the motor is at or above the second predetermined stator frequency, P is a number of pole pairs of the motor, $Emf_q$ is a back-EMF voltage on a q-axis, $I_q$ is torque current, $\omega_e$ is motor-excited frequency, $f_{stat}$ is stator frequency, and $f_2$ is a high-speed stator frequency limit.

11. The torque calculation method of claim 8, wherein the third algorithm comprises:

$$T = (f_{stat} - f_1) \frac{(T_H - T_L)}{(f_2 - f_1)}, (f_1 < f_{stat} < f_2)$$

wherein

T is the torque when the motor is between the first predetermined stator frequency and the second predetermined stator frequency, $f_{stat}$ is stator frequency, $f_1$ is a low-speed stator frequency limit, $T_H$ is the torque when the motor is at or above the second predetermined stator frequency, $T_L$ is the torque when the motor is at or below the first predetermined stator frequency, and $f_2$ is a high-speed stator frequency.

12. A system for use with an electric powertrain between a field oriented induction motor and a mechanical load, the system comprising:

a torque-control circuit coupleable to respond to a desired-torque input, the torque-control circuit coupleable to infer a stator frequency of the field oriented induction motor and the torque-control circuit further coupleable to supply a current to the field oriented induction motor, the torque-control circuit configurable to supply the current dependent upon the desired-torque input, the stator frequency, and a combination of an upper-range stator frequency torque equation and a lower-range stator frequency torque equation.

13. The system of claim 12, wherein the torque-control circuit coupleable to respond to a desired-torque input comprises:

the torque-control circuit coupleable to respond to an accelerator position.

14. The system of claim 12, wherein the torque-control circuit coupleable to infer a stator frequency of the field oriented induction motor comprises:

the torque-control circuit coupleable to sense a speed associated with the mechanical load.

15. The system of claim 12, wherein the torque-control circuit coupleable to infer a stator frequency of the field oriented induction motor comprises:

the torque-control circuit coupleable to sense a current in a stator of the field oriented induction motor.

16. The system of claim 12, wherein the torque-control circuit configurable to supply, the current dependent upon the desired-torque input, the stator frequency, and a combination of an upper-range stator frequency torque equation and a lower-range stator frequency torque equation comprises:

an interpolation unit configured to interpolate between a first current and a second current, the first current determined by the upper-range stator frequency torque equation as a function of the desired-torque input and the stator frequency, and the second current determined by the lower-range stator frequency torque equation as a function of the desired-torque input and the stator frequency.

17. The system of claim 16, wherein the interpolation unit comprises:

at least one of a hardware module, a software module, a firmware module, and a combination module.

18. The system of claim 12, wherein the mechanical load comprises at least one of a shaft, an automobile drive, an electric generator, an electric alternator and a compressor.

19. A motorized vehicle comprising:

a powertrain having an input mechanically coupled to a field oriented induction motor and an output mechanically coupled to a load, the powertrain having a torque-control circuit responsive to a desired-torque input, the torque-control circuit coupled to infer a stator frequency of the field oriented induction motor and the torque-control circuit further coupled to supply a current to the field oriented induction motor, the torque-control circuit configured to supply the current on the basis of a relationship keyed to at least two predetermined stator frequencies.

20. The motorized vehicle of claim 19, wherein the motorized vehicle comprises at least one of an electric vehicle having a traction drive system, a hybrid-electric vehicle having a traction drive system, and a fuel-cell powered vehicle having a traction drive system.

21. The motorized vehicle of claim 19, wherein the torque-control circuit coupled to infer a stator frequency of the field oriented induction motor comprises:

the torque-control circuit coupled to sense a speed associated with the load.

22. The motorized vehicle of claim 19, wherein the torque-control circuit coupled to infer a stator frequency of a field oriented induction motor comprises:

the torque-control circuit coupled to sense a current in a stator of the field oriented induction motor.

23. The motorized vehicle of claim 19, wherein the torque-control circuit configured to supply the current on the basis of a relationship keyed to at least two predetermined stator frequencies comprises:

an interpolation unit configured to use a first torque equation when a sensed speed is less than or equal to a first predetermined speed;

a second torque equation when the sensed speed is greater than or equal to a second predetermined speed, and an interpolation of the first torque equation and the second torque equation when the sensed speed is between the first predetermined speed and the second predetermined speed.

24. The motorized vehicle of claim 23, wherein the interpolation unit comprises:

at least one of a hardware module, a software module, a firmware module, and a combination module.

25. The motorized vehicle of claim 19, wherein the load comprises a mechanically drivable component of the motorized vehicle.

* * * * *